April 24, 1962

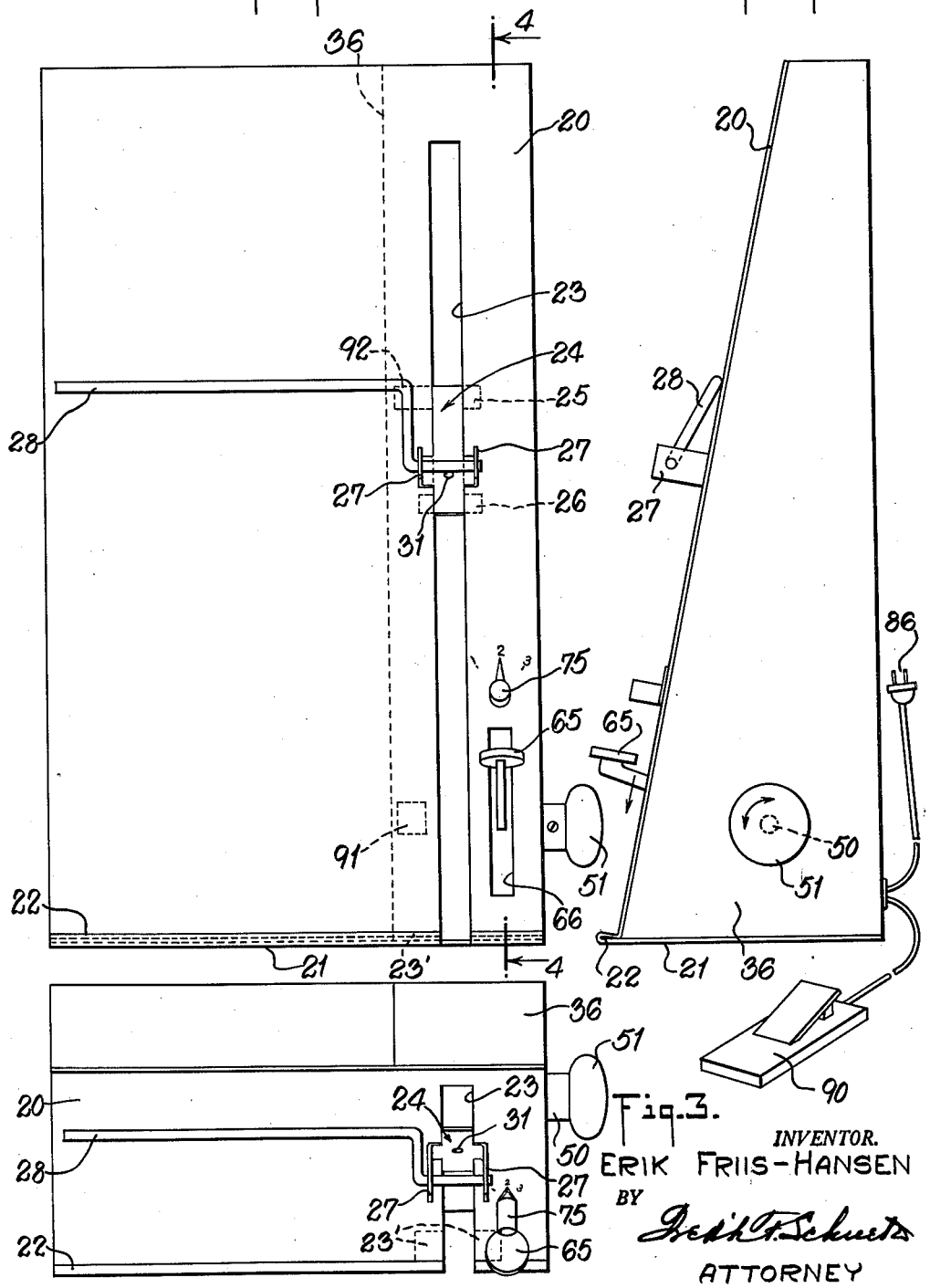

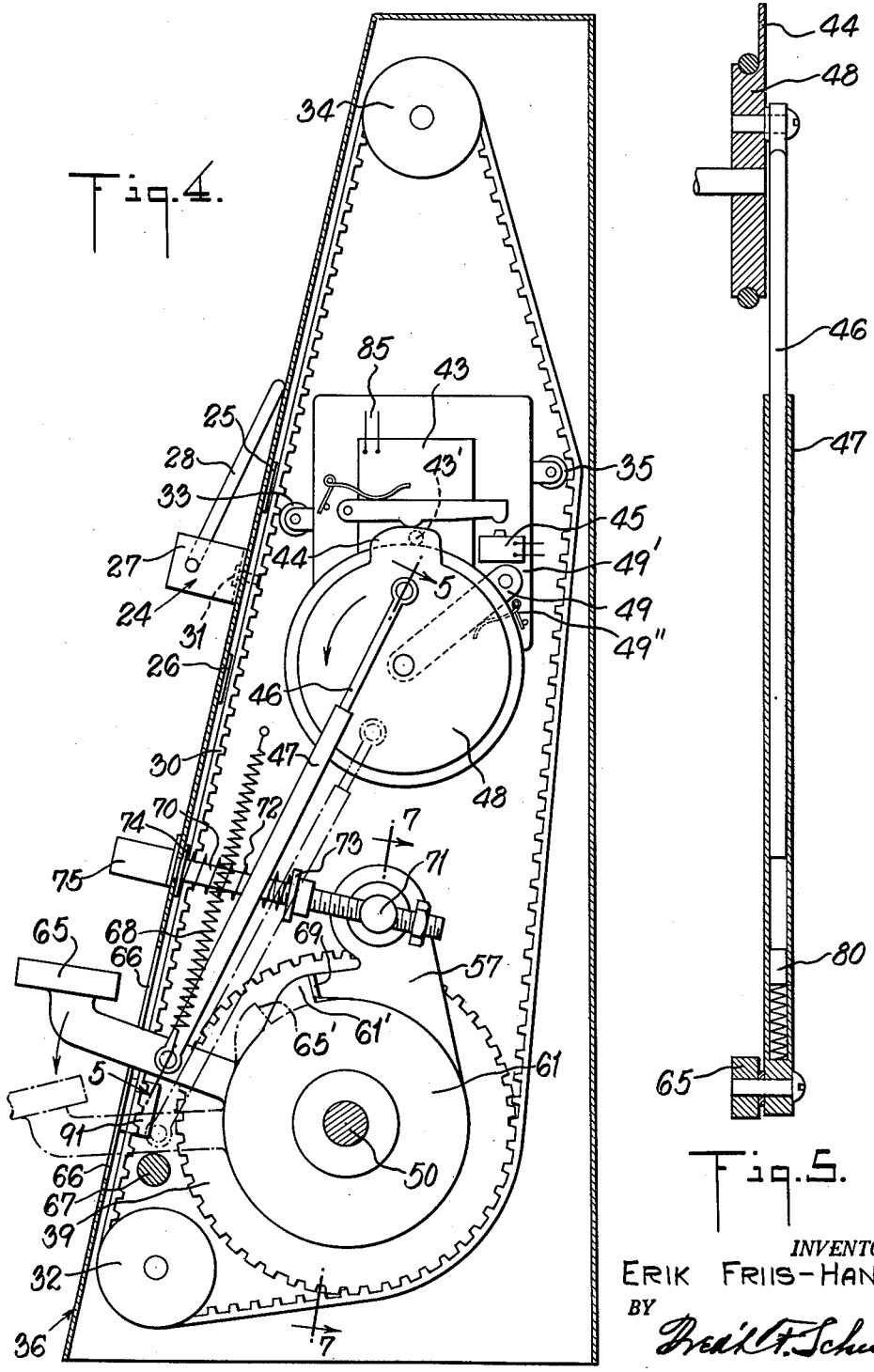

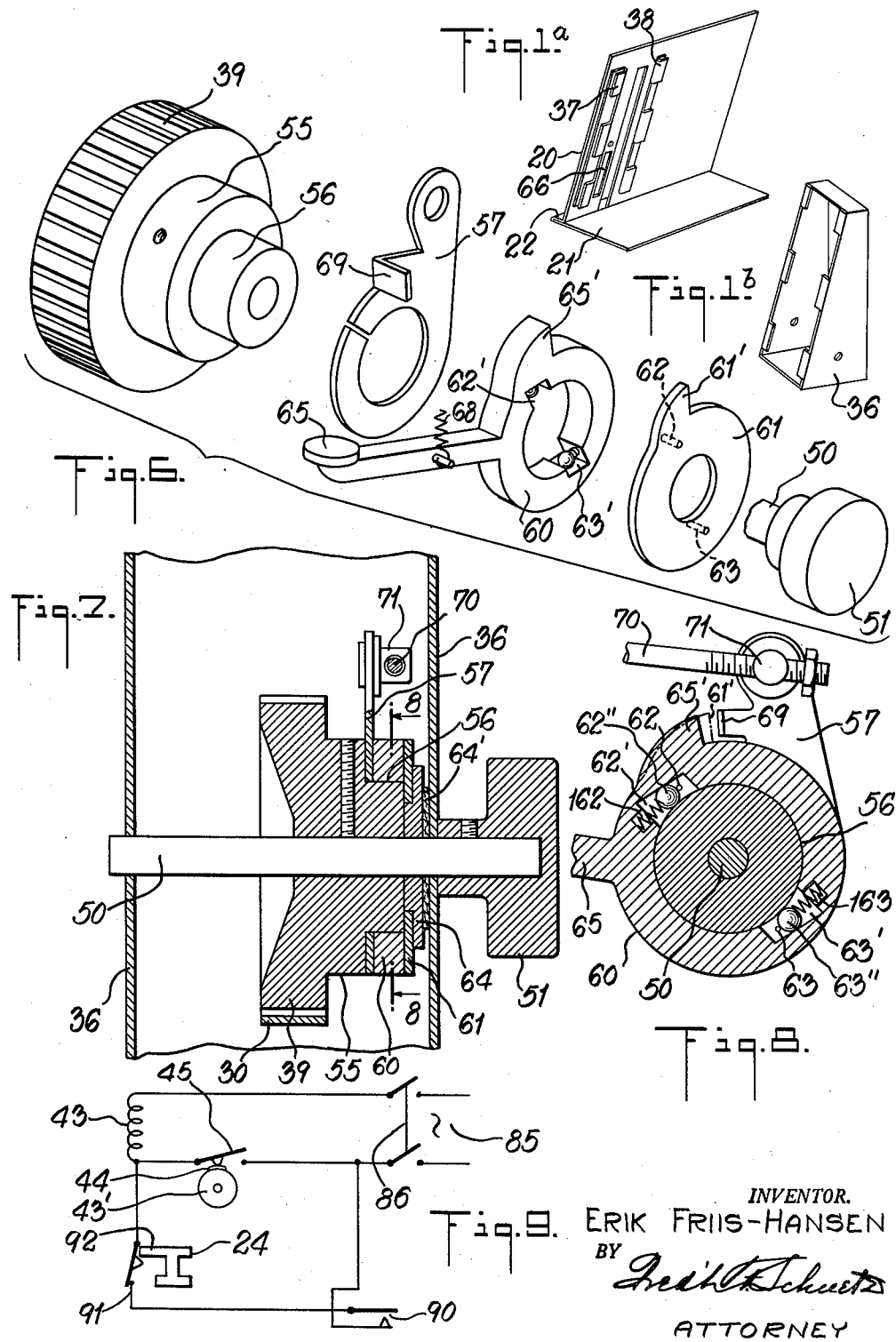

E. FRIIS-HANSEN 3,030,924

ELECTRICALLY AND MANUALLY OPERABLE
LINE INDICATOR FOR COPY HOLDERS

Filed March 10, 1960

INVENTOR.
ERIK FRIIS-HANSEN
BY
Fred'k F. Schultz
ATTORNEY

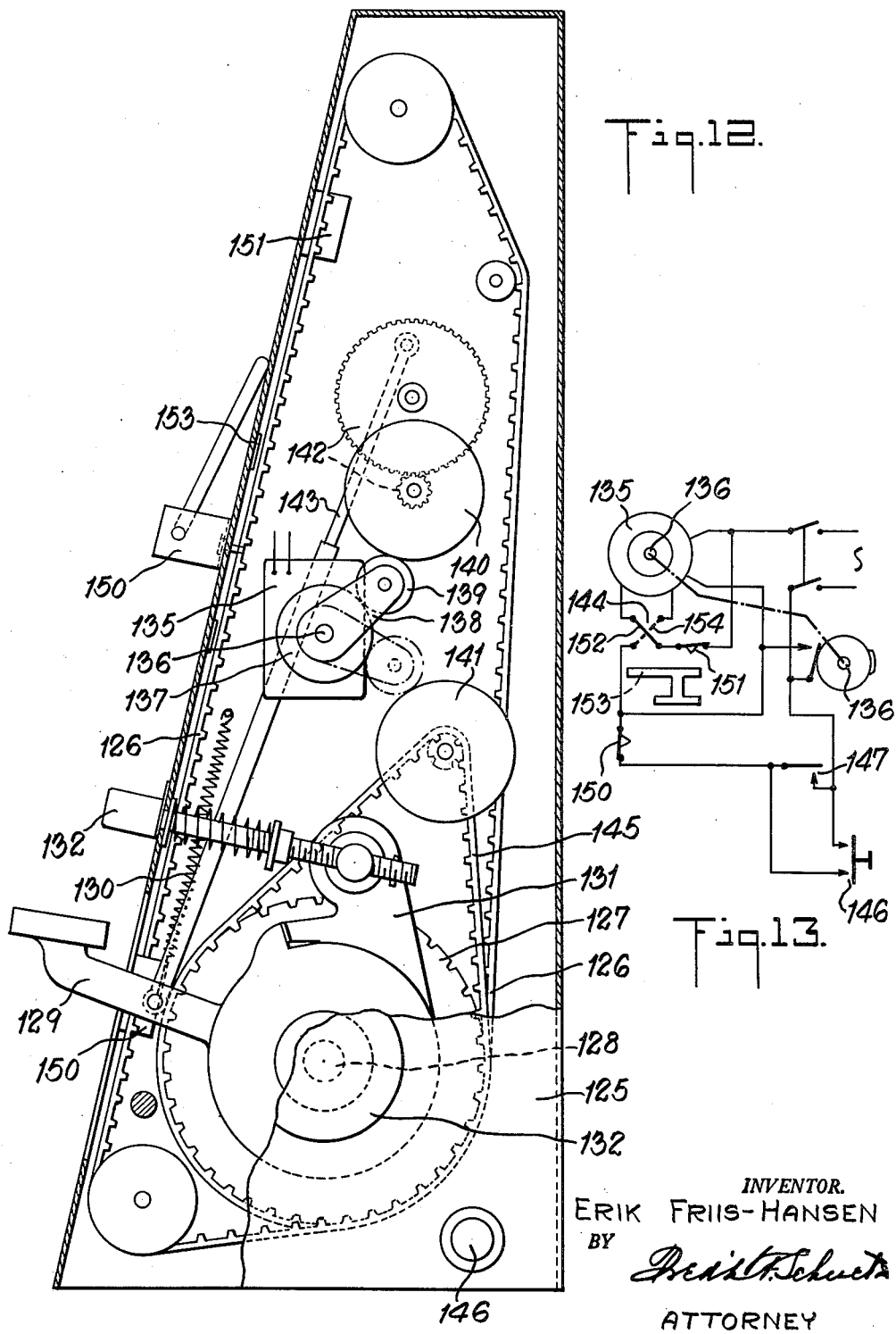

United States Patent Office 3,030,924
Patented Apr. 24, 1962

3,030,924
ELECTRICALLY AND MANUALLY OPERABLE
LINE INDICATOR FOR COPY HOLDERS
Erik Friis-Hansen, % Keystone Hotel, 161 W. 36th St.,
New York, N.Y.
Filed Mar. 10, 1960, Ser. No. 14,046
9 Claims. (Cl. 120—34)

The invention relates to copy holders such, for example, as are utilized in the support of stenographer's note books, a sheet of paper, etc., and from which data thereon is to be transcribed. As generally constructed, such holders comprise a supporting base affording a ledge and a rearwardly directed surface for suitable support of copy. A resilient slider member, generally manually adjustable, is associated therewith for successive alignments, of a cross-arm carried thereon, with respect to the thus supported copy, as the transcribing progresses and as is well understood.

In a prior application, Serial #787,734, filed by me, I have disclosed a novel form of slider-member-support assembly wherein a cross-arm is resiliently and oscillatably supported for displacement manually over the copy-supporting surface.

It is an object of the present invention to provide means whereby displacement of such slider member or the like may be effected automatically—that is to say, for example through intermittent operation of a suitable treadle member, as well as manually.

A further object of the invention is to provide an arrangement to this end which will allow, also, of the election of adjustment of the displacement to any one of a plurality of line-spacings.

A still further object of the invention is to provide, in association with the automatic spacing means, as well as with manually operable means, a further manual control—operating independently of the aforesaid automatic and manual spacing means—which will admit of manul, independent and continuous reciprocations (adjustment) of the slider member within its range of travel.

In accordance with the invention, provision is made whereby the cross-arm, carried by the slider member, is associated through the latter with an actuating, electrical power-drive means for operation of displacing means connected with the said slider member; operation of the power drive means being controlled by a treadle or like means. Provision also is made for manual operation of the displacing means independently of the said treadle means.

A two-way manual control of said displacing means, furthermore, is afforded for independent operation of the slider member.

The nature of the invention, however, will best be understood when described in connection with the accompanying drawings, in which:

FIG. 1 is a front elevation; FIG. 2 a slide elevation; and FIG. 3 a plan view of the novel copy holder.

FIGS. 1-a and 1-b are perspective views, on a reduced scale respectively, of the copy-support member and the operating mechanism housing which is removably associated therewith.

FIG. 4 is a vertical section, on an enlarged scale, through the slider member control unit, taken on the line 4—4, FIG. 1 of the drawings, and looking in the direction of the arrows.

FIG. 5 is a fragmentary vertical section, on an enlarged scale, taken on the line 5—5, FIG. 4—looking in the direction of the arrows; and illustrates the provisions whereby proper action of automatic operation of the slider member displacing means is assured.

FIG. 6 is an exploded view, in perspective and on an enlarged scale, of the line-selector, drive-control unit.

FIG. 7 is a fragmentary detail, longitudinal section of the assembled control elements shown in FIG. 6 and as mounted in a housing.

FIG. 8 is a fragmentary vertical section of clutch means associated with the line advancing means—taken on the line 8—8, FIG. 7 of the drawings, and looking in the direction of the arrows.

FIG. 9 is a diagrammatic view illustrating the electrical circuits involved in the operation of the line spacing operations.

FIG. 12 is a vertical section through a modified form of the slider member control unit; and FIG. 13 is a diagrammatic view illustrating the corresponding electrical circuits utilized for its operation.

Figure 10:
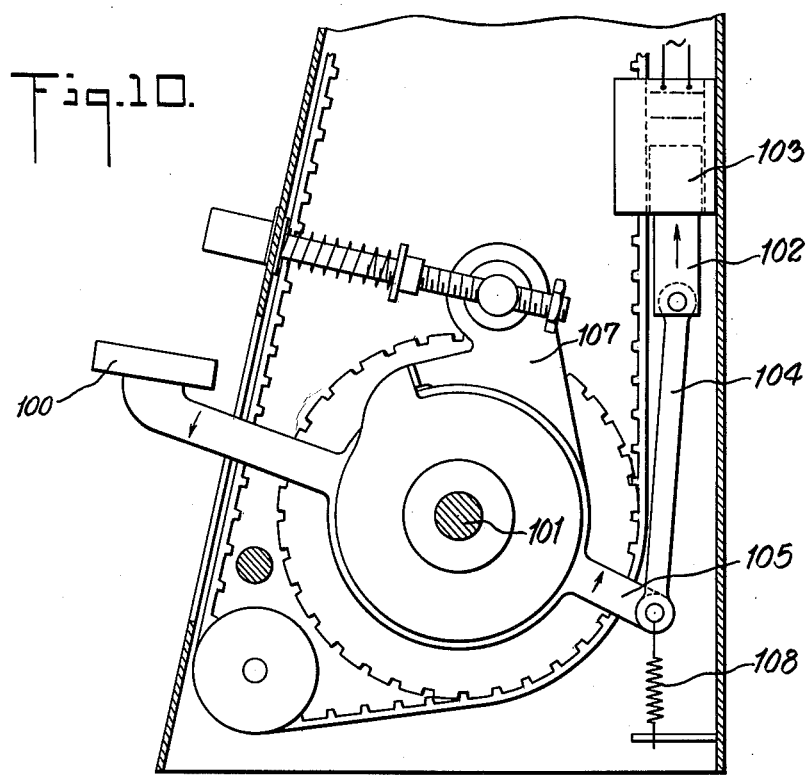
FIG. 10 is a fragmentary detail view, on an enlarged scale, illustrating a modification in the power-drive means for effecting displacement of the slider member.

Referring to the drawings, more particularly to FIGS. 1 to 9 thereof, the copy support element 20 is afforded by a blank of generally rectangular conformation, and of a thickness of suitable material—as sheet iron, aluminum or heavy plastic—such that when formed into the required final shape, as hereafter set forth, it will possess rigidity and weight sufficient to maintain proper stability in use. In accordance with the invention, the lower portion of the blank is bent rearwardly at an angle to the front face to afford a base support 21 for the holder; and at the front is preferably doubled upon itself to provide a slightly upturned ledge 22 for support of copy. The blank, moreover, is punched to provide along and parallel to its one (right-hand) side edge an elongated slot 23, terminating at the bottom in a lateral entrance opening 23', for introduction of a slider member 24.

Such slot extends from a short distance below the upper edge of the sheet through to the bottom, forwardly-directed ledge portion 22 and supporting base portion 21 of the holder; and it is designed to accommodate the elongated slider member 24 constructed of a more or less resilient material. This slider element is provided at its respective ends with lateral, oppositely-extending pairs of tabs 25, 26 which are designed to fit behind, and to bear resiliently upon, the rear face of blank copy support portion 20.

A pair of intermediate ears 27 is also carried by or, preferably, is provided integrally with the slider element 24, and they extend upwardly therefrom to provide bearings for and to carry on oscillatable cross-arm 28. The latter is arranged then to extend laterally over the front face or copy-support surface of the blank 20—all substantially as is set forth in my said co-pending application. The said cross-arm, moreover, is adapted for successive juxtapositioning to the respective lines of copy (not shown) when copy is supported on said front face of the copy support.

The instant invention, however, is concerned more especially with means for advancing successively the said slider member 24 with its cross-arm 28 automatically, as well as manually, to juxtapose it to lines of copy when retained on the said front face, and in accordance with the particular line spacing of such copy. To this end, there is associated with the hereinbefore described unit a novel advancing means for effecting an intermittent progression downwardly of said slider element 24 in accordance with the selected line spacing; and, as well, a manual or power return thereof—as in restoring it to its initial uppermost location, or to intermediate locations.

The said means to this end includes, reference being had to FIG. 4, an actuating means, for example, an endless timing belt 30 which is secured flexibly to the slider element 24 as by means of a bolt 31. This belt is then guided over a series of rollers 32, 33, 34 and 35 to run immediately behind the said slot.

The aforesaid operating elements are carried, preferably by a suitable housing 36, FIG. 1b, which is slidably mounted, for convenient assembly and removal, in guide channels 37, 38 on the rear of the copy-supporting portion of the copy holder 20. By this expedient, better stability of the unit is achieved, aside from the convenience of assembly or replacements.

In addition, there is contained within the housing 36 a motor-driven timing gear 39 in engagement with the timing belt 30. Furthermore, there is provided an electric motor 43 with associated cam control 44 for actuating electrical contact means 45 controlling the motor operation. A crank operated piston means or connecting rod 46 is arranged for actuation (reciprocation) by the said motor, and within a cylinder or tube 47 to effect advance movement of the gear 39, as will hereinafter be set forth. The rod 46 to this end is actuated from said motor through connection (eccentrically) to a friction drive means including a rubber-rimmed friction disk 48 contacting the motor drive shaft 43' and being rotatably supported centrally on the free end of a swingable arm 49 which is pivoted at its other end to the motor frame 49'. The said motor 43 is caused to rotate clockwise, and, similarly, its shaft 43' for rotating the friction disk 48 counterclockwise.

A spring 49" secured to the motor frame 49' bears against the side of arm 49 to urge the rim of disk 48 toward of said motor shaft 43' to maintain satisfactory transmission of power for rotation of the said disk.

Reference being had to FIGS. 4 to 8 inclusive, which show in detail the drive and control means for operation of said timing belt 30—and through it of the slider element 24—it will be noted that the timing gear 39 is secured to a shaft 50 to rotate therewith, said shaft being mounted in the opposite side walls of the housing 36. To one end of this shaft, extending exteriorly of the said housing, there is fixedly secured an operating knob 51, FIGS. 1 and 2, whereby to rotate said shaft manually for effecting movement of the belt 30, as when it is desired to return the slider member 24 to its initial uppermost starting position, or to some intermediate location with respect to the copy.

Furthermore, the shaft 50 bears the following additional elements: the integral 2-step hub portions 55 and 56 of the said timing gear 39. In accordance with the invention, the first step (greater diameter) portion 55 serves as a support for a line spacer element as for location of a split-ring, resiliently mounted, line-selector member 57, as will hereinafter be more fully set forth.

Also, the immediately adjacent second-step hub portion 56 carries a ball-clutch drive member 60 for imparting a one-direction rotation to the shaft 50. This is followed by a ball-clutch release element 61—to allow of manual operation of the shaft 50 in either direction of rotation—immediately abutting the said ball clutch member and being provided with diametrically-disposed, laterally-directed pins 62, 63 adapted to extend into said clutch element, tapered locking cavities 62', 63' respectively.

The mounting of said release disk 61, contrary to that of the line selector and ball clutch elements, is such that its one side face contacts the hub portion 56 which acts then as a shoulder for the same, said release element to this end being mounted freely over a flanged spacer washer 64 loose on such shaft. This washer is provided to maintain the entire unit intact; and the flange side of the washer to this end facing the juxtaposed wall of the housing 36—a felt washer 64', also, being interposed between the same and the housing wall.

The clutch member 60 includes an outwardly-extending, integral operating handle or key 65 for rotating manually in one direction—effecting downward movement of the slider element 24—the said shaft 50, said handle to this end projecting outwardly through a vertical slot 66 in the face of the copy support surface 20. Depression of said key member, however, is limited through contact with a transversely disposed stop pin 67 positioned below the said key; and a retractile means such as a spring 68 is attached to the casing and said key member to return the latter in accordance with the "set" position of an adjustable stop 69 of the line selector member 57. The adjustment of this member, it will be understood, begins from a permanent 1-line spacing position and to which, also, the connecting rod 46 is adjusted. It will, of course, be understood that, in the case of motor control, the force exerted by the said spring shall not exceed the thrust exerted by the motor action on the connecting means, which applies also to the manually-applicable force.

The particular desired line-spacing may thereby be determined readily both for manual operation as well as for automatic (treadle-controlled) operation. The actual setting of the stop 69 for this purpose is effected by an angular displacement manually from the front of the holder by rotation of the outer end or knob 75 of a rod 70. The inner end of said rod is, for this purpose, extended into the housing and is threaded into a swivelled threaded block 71 of the line selector member 57. A spring 72, located about the rod between an adjustable collar 73 thereof and a washer 74 abutting the inner face of the copy holder, effects adjustment when the rod is rotated by accordingly manipulating the outer end or knob 75 thereof. The particular angular position of the adjusted selector member stop 69, will then determine the spacing interval. Thus, as adjustment is made for more than 1-line spacing, the stop 69 recedes and the tube 47 follows accordingly together with the key member 65.

Adjustment as to line spacing—for example, 1, 2 or 3 lines—is thus readily attained, the actual spacing displacement of the cross-arm 28 being accomplished then, for example, manually by depressing the key member 65 to rotate shaft 50 counterclockwise until the said key member engages with stop pin 67—the clutch member 60 being effective only in this direction of rotation and thus securing the desired rotational direction of the shaft 50. Upon release of said key member, however, it will be automatically restored to its normal upward position under the action of the retractile spring 68 attached at its respective ends to the said key member and to the housing. To this end, the pins 62, 63 of the release element 61 restrain the balls 62", 63" of the clutch drive member and thereby permit the latter to ride freely on the shaft 50 for return of said key to its normal position—the nose 65' of said clutch then contacting stop 69.

When the downward line-spacings have been thus completed, the slider member 24 with cross-arm 28 may be returned, for example, manually to the top of the copy (not shown), or to some intermediate position. This is then accomplished by the manual rotation of shaft 50, through manipulation of the external knob 51 thereof, in a clockwise direction—clutch 60 then being ineffective in this direction of rotation, as hereinafter set forth.

The clutch member 60 to this end is provided with two tapered cavities 62', 63' in which are located respectively two sets of three elements each. Thus, inwardly from the wider end of the tapered cavities, there is provided respectively two coiled springs 162, 163; the balls 62", 63"; and the pins 62, 63 projecting laterally from the side of the release disk 61 into the side of the cavities 62', 63' of the clutch member and contacting the corresponding balls oppositely to the contact of springs 162, 163 therewith.

The said springs will force corresponding balls toward the tapered ends of the respective cavities for clutching the key member 65 to the shaft 50, so that in depressing the said key member said shaft 50 will be rotated until the key member is stopped by contact with the stop 67— the degree of rotation having been determined in advance by the setting of the stop member 57.

However, due to the action of spring 68 on the said member 65, the latter is immediately returned, upon release, and without effect on the shaft 50, to the normal (full line) position—nose 65' of the clutch portion 60, as well as the nose 61' of the release disk 61, having temporarily lost contact with the stop 69. Upon re-establishment of these contacts, nose 61' will contact stop 69 prior to similar contact by the clutch nose 65' and thus rendering pins 62, 63 stationary. Clutch member 65 will then advance toward stop 69; and as nose 65' thereof also contacts stop 69, the pins 62, 63 which are then stationary will force the respective balls back into the wider portions of the cavities, leaving the clutch free so that the shaft 50 may be manually rotated in either direction by correspondingly manipulating the knob 51.

The foregoing operation of effecting the successive line spacings is a purely manual one. However, the novel construction lends itself, also, to power operation. Thus, reference being had to FIGS. 4, 5 and 6 of the drawings, there is indicated as associated with the said means operated by the key member 65, additional and electrically-controlled means for effecting the depressing operation on the said key member.

To this end, the motor 43 under one complete rotation (cycle) of the disk 48 will reciprocate the rod 46 for depression of the key member 65 similarly to a manual operation thereof—the lower end of said rod being arranged to contact a resiliently-acting buffer means 80 supported within the lower end of the tube 47. There will thus be exerted a reactive force during the advancing of the gear which will enhance the frictional contact for the driving of the connecting rod 46. Rod 46, when in its uppermost location, is a calculated distance from the buffer element 80 which consequently introduces no initial resistance when starting the motor.

Upon a closing operation of the contact 45, power from the power main 85, FIG. 9, as provided, for example, through a plug contact means 86, FIG. 2, will be interrupted at the completion of one revolution (cycle) of the said disk.

To effect the aforesaid operation by said motor, when said plug has been inserted, provision is made to control the same by introducing an additional suitable circuit-closing means such as, for example, the treadle-operated contact-making member 90. This is to be introduced into a circuit in shunt with the aforesaid motor circuit—as is indicated in the wiring diagram, FIG. 9 of the drawings.

There is also included in, and in parallel with said motor circuit, an additional and normally-closed switch 91 which is designed to be opened by contact with an extension 92 of the slider member and secured to and moving with the timing belt 30—before said slider member 24 may contact the base of the copy holder (bottom of the slot 23); or, upwardly through a further and series-connected switch 151, FIG. 13, and prior to completion of the motor operation cycle.

It will be understood, that such downward (or upward) travel limits of the slider member shall thereby be effective such that reciprocations of the slider member shall not exceed the distance that the slider member is reciprocable by the motor operation through a complete cycle of said motor operation.

While the action of this switch 91 or the similar switch 151 in thus opening will not affect control of the motor power supply for completion of the revolution of disk 81, it would prevent reactivation of the motor when the power supply is eventually interrupted by the action of cam 44 with respect to the switch 45 for completion of a cycle. Normally, operation of the motor can then only be restored, for electrical operation of the slider member, by the action of the treadle 90. To this end, a circuit-interrupting extension 92 of the slider member is arranged to engage with the switch member 91 to open the motor control circuit thereat and thus to limit the downward travel of the slider member. This member is then only returnable (manually) as hereinbefore set forth through rotation of the knob 51.

In view of the fact that the aforesaid drive from motor 43 is transmitted mechanically through cylinder 47 to the manually-operable member 65, the provision of the aforesaid circuit-interrupting element 92 insures that the downward travel of slider member 24 will be limited to a point in advance of the bottom of the slot 23 and thus beyond the point where the rod 46 has traveled beyond its dead center position. The said rod will then merely compress accordingly the said spring buffer member and be permitted to continue sufficiently in its travel to clear the dead center point and allow completion of the cycle.

If the motor be not operated, the slider member is then free to be successively displaced downwardly by accordingly depressing said key member 65 manually, as hereinbefore set forth—the successive downward displacements being in accordance with the preset line spacing desired and as effected by adjustment of member 57. It will be understood, of course, that an upward adjustment is available, under all conditions, merely by manual rotation of the knob 51 which then correspondingly travels continuously the timing belt 30 rather than in pre-determined steps, as is the case of the aforesaid key or treadle operations.

While the power-actuated means for effecting operation of the mechanical travel of the oscillatable arm downwardly over the surface of the copy holder has herein been set forth as being of the electrical motor type, it is possible, also, to attain the desired result by other electrical means. Thus, reference being had to FIG. 10 of the drawings, power displacement (angular depression) of the key member 100 for the purpose of rocking shaft 101 to which it may be clutched, as hereinbefore set forth, is attained through operation of a reciprocable member such as the plunger 102 of a solenoid 103. The former, to this end, is connected through a link 104 with a radially-extending arm 105 of the key member 100 and located oppositely thereto. The degree of angular displacement will be determined, similarly, by the setting of the line selector member 107—the plunger 102 being correspondingly displaced inwardly, as is indicated by the respective dotted-line positions shown, for one, two or three line spacings. A return spring 108 attached to the link 104 restores then the various members to their normal positions shown.

Figure 11:
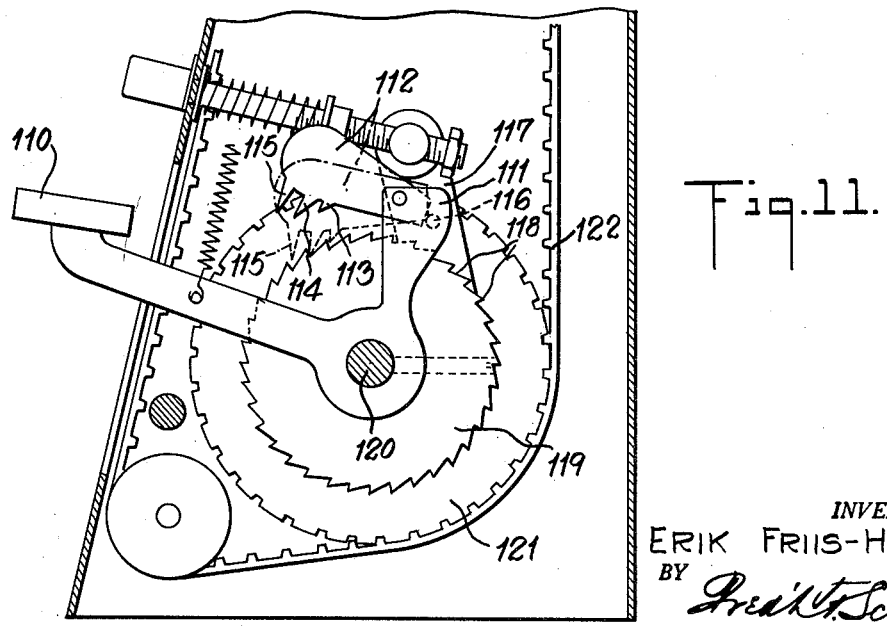
FIG. 11 is a similar view illustrating a further modification, more specifically with respect to the line-spacing means.

In FIG. 11 a further modification is illustrated, more especially with respect to the mechanism for determining the line spacing desired. Thus, the manually operable key member 110 is in the nature of a bell-crank, the inner arm 111 of which then carries a pivoted pawl 112 which is provided at its outer end with a plurality, for example, three downwardly directed teeth 113, 114 and 115 of progressively greater separation outwardly. The inner end of said pawl, moreover, rocks on the arm 111 and operates against a stop pin 116 extending from the line selector member 117—said pin normally causing the said teeth to remain disengaged from the ratchet teeth 118 of a disk 119 secured to the shaft 120. To the latter is also secured the driving gear 121 for the timing belt 122. The driving gear 121 is also mounted on this shaft 120 to transmit intermittent progression of said gear and in accordance with the particular one of the teeth engaging with said ratchet wheel—this being determined by the adjustment of the selector member 117, as hereinbefore set forth.

It may be desirable, in some instances, to effect power actuation of the timing belt—for advance in both directions—in the positioning automatically of the slider member from a common drive means such as a reversible electric motor. However, in such operation, it will be understood that the manual operation by a conventional key member is retained, as well as the knob control.

Reference being had to FIGS. 12 and 13 of the drawings, mechanism to this end is retained, for example, within the housing 125; and it comprises: the timing belt 126 and driving gear 127 therefor, as well as the shaft 128 to which the manually operable key member 129 is clutched, as hereinbefore set forth. The said key member is similarly tensioned upwardly by means of a retractile spring 130. The line-spacing means 131, furthermore, is to be similarly and adjustably mounted on the hub of said shaft 128; and there is provided, as well, the manipulating knob 132. The driving means, however, is in this embodiment a reversible electric motor 135, the driving shaft 136 of which rotates a friction disk 137. There is further provided on the shaft 136 a swingable arm 138 bearing at its outer end a friction roller 139 in frictional engagement with the driving friction disk 137. The roller, in turn, is adapted for driving engagement with either one of two friction disks 140, 141, the former serving through a gear transmission 142 for effecting the reciprocations of the connecting rod 143 and the depression thereby of the key member 129 (full line position of the arm 138), as in the hereinbefore described embodiments.

However, by reversing the direction of rotation of the motor through operation of a switch 144, the roller 139 (broken line position) will be caused to contact the friction disk 141 transmitting rotation thereto as well as to an additional timing belt 145. The latter will effect the travel of the slider member in a direction to return the same to the desired starting position.

The power circuit in this embodiment requires then an additional motor control, viz: the reversing switch 144 and, preferably, also a manually operable push-button switch 146 in parallel with the treadle-controlled switch 147. By this expedient, in addition to the controls (both manual and automatic) of the previously-described embodiments, the spacing advance and the return of the slider member with cross-arm may be effected completely under electrical control.

Provision is made in this embodiment for the addition to the power-interrupting means 150 for extreme downward travel, of a similar means 151 to limit upward travel, said means being included in the reverse (upward) travel lead 152—both switches being normally closed. These switches, however, may be opened under excessive travel in the appropriate direction by contact therewith of the slider member extension 153, carried by the timing belt. For downward travel protection, the member 153 is designed to contact the normally closed switch 150 located in the lead 154 to the motor; and for reverse operation the switch 151. Normally, both of these switches remain closed; and the motor 135 may be activated either by the treadle-controlled contact 147 or by the manually (push button) controlled contact 146—the direction of rotation of the motor being in accordance with the setting of the motor switch 144.

I claim:

1. A copy holder unit comprising the combination with a generally-rectangular sheet of rigid material affording a copy-support surface bent transversely rearwardly at its lower portion to afford a horizontal base support—a longitudinal slot extending in the sheet from its lower portion, parallel to one of the side edges of the sheet, to a short distance below the upper edge thereof; and a slider member mounted in the slot for reciprocation therein, together with a cross-arm attached thereto and extending laterally over the copy-support surface; of means for effecting travel of the cross-arm over said surface and including an endless timing belt connected with the slider member, and a shaft rotatably carried by the said sheet; a driving gear mounted on the shaft and engaging said belt; a manually-depressible key member, and intermediate mechanism for rotating successively, in one direction only, the said shaft to traverse said cross-arm over the copy-support surface; power-operated means connected with the key member to depress the same; resilient means to restore said key member to its initial position upon completion of each actuation; and a second element associated with the driving gear for rotating the same in the opposite direction to return said slider member over the copy-support surface.

2. A copy holder unit according to claim 1, wherein retractile means are provided to restore automatically, upon its release, the key member to its original location.

3. The copy holder unit according to claim 1, wherein an intermediate, axially-resilient means is provided in the key member, power-operated connection.

4. The copy holder unit according to claim 1, wherein a connecting rod element mounted for reciprocation within a cylinder is provided, the latter being pivotally attached to the manually-depressible key member to effect its depression, once during a complete reciprocation of said connecting rod element.

5. The copy holder unit according to claim 4, wherein an elastic buffer means is interposed, within the cylinder, between the free cylinder-end of the connecting rod element and the bottom of the cylinder.

6. The copy holder unit according to claim 1, wherein the power-actuated means is an electric motor and the operating circuit therefor includes an electrical source of power and a series-connected switch, controlled by the operation of the motor is provided to interrupt cyclically the supply of power to the motor; an auxiliary circuit in shunt with said motor-operating circuit is provided; and a normally-open, treadle-actuated contact-making means is located in the shunt circuit for effecting energization of the motor.

7. The copy holder unit according to claim 6, wherein a normally-closed switch is included in series in said shunt circuit; and a member carried by the timing belt is adapted for engagement with said switch, to open the shunt circuit, at a predetermined point in the downward travel of the timing belt.

8. The copy holder unit according to claim 5, wherein friction-drive means are included between the motor and the reciprocable connecting rod.

9. The copy holder unit according to claim 8, wherein the friction drive means includes a swingable, rotatable element for effecting reversal of the direction of travel imparted to the timing belt.

References Cited in the file of this patent

UNITED STATES PATENTS

| | | |
|---|---|---|
| 624,555 | Smith | May 9, 1899 |
| 879,016 | Starr | Feb. 11, 1908 |
| 988,700 | Fisher | Apr. 4, 1911 |
| 1,006,270 | Planert | Oct. 17, 1911 |
| 1,245,027 | Rhoads | Oct. 30, 1917 |
| 1,393,116 | Guthridge | Oct. 11, 1921 |
| 1,768,753 | Fensky | July 1, 1930 |
| 2,494,129 | Holton | Jan. 10, 1950 |
| 2,906,242 | Greenberg | Sept. 29, 1959 |